United States Patent [19]
Gili Picoy

[11] Patent Number: 5,318,807
[45] Date of Patent: Jun. 7, 1994

[54] PROCESS FOR PREPARING PRINTED SHEETS WITH OPTICAL EFFECTS

[75] Inventor: Palmira Gili Picoy, Barcelona, Spain

[73] Assignee: Juan Grifoll Casanovas, Barcelona, Spain

[21] Appl. No.: 923,688

[22] Filed: Aug. 3, 1992

[30] Foreign Application Priority Data

Oct. 28, 1991 [ES] Spain .................. P9102378
Jun. 17, 1992 [ES] Spain .................. P9201250

[51] Int. Cl.⁵ .............................. B05D 3/06
[52] U.S. Cl. .................... 427/510; 427/162; 427/270; 427/278; 101/3.1; 101/32
[58] Field of Search ............... 427/162, 270, 271, 277, 427/278, 510, 511; 118/46, 102; 101/3.1, 22, 23, 32; 264/1.3

[56] References Cited

U.S. PATENT DOCUMENTS

| | | | |
|---|---|---|---|
| 4,920,039 | 4/1990 | Fotland et al. | 430/324 |
| 5,003,915 | 4/1991 | D'Amato et al. | 118/46 |
| 5,116,548 | 5/1992 | Mallik et al. | 427/162 |
| 5,164,227 | 11/1992 | Miekka et al. | 427/278 |

FOREIGN PATENT DOCUMENTS

| | | | |
|---|---|---|---|
| 49-28262 | 7/1974 | Japan | 427/511 |
| 51-39275 | 10/1976 | Japan | 427/510 |
| 53-121870 | 10/1978 | Japan | 427/510 |
| 53-139666 | 12/1978 | Japan | 427/511 |
| 59-132975 | 7/1984 | Japan . | |
| 59-199249 | 11/1984 | Japan | 427/510 |
| 1-145141 | 6/1989 | Japan . | |
| 2-86440 | 3/1990 | Japan . | |
| 2-231136 | 9/1990 | Japan . | |

*Primary Examiner*—Terry J. Owens
*Attorney, Agent, or Firm*—Cushman, Darby & Cushman

[57] ABSTRACT

A process for printing a sheet with selected optical effects includes printing on the sheet by conventional printing a pattern or design, thereafter coating at least part of the design with a resin, thermoplastic lacquer or other transparent material which impregnates the surface of the sheet and then engraving the selected area by applying pressure and heat to produce optical effects; the resin that is applied is polymerizable by ultraviolet rays from within a transparent calendar used for the engraving and is polymerized at the same time as the engraving is effected.

7 Claims, 3 Drawing Sheets

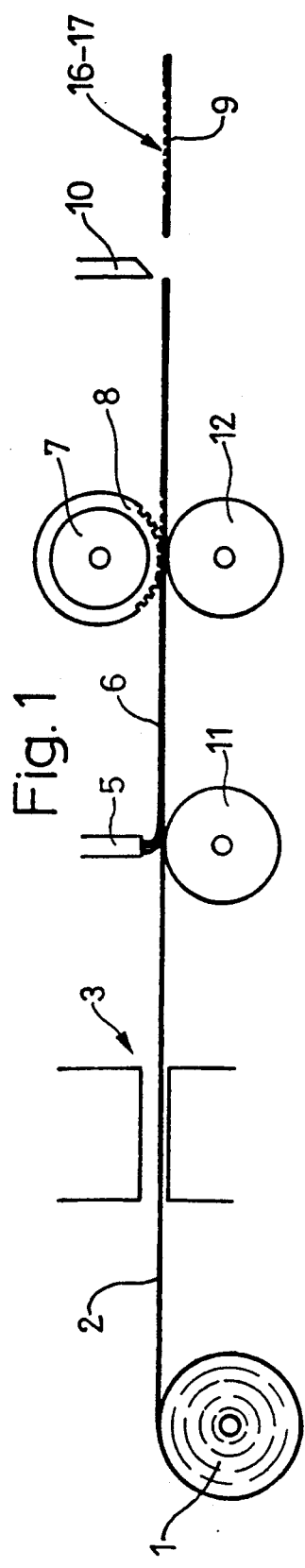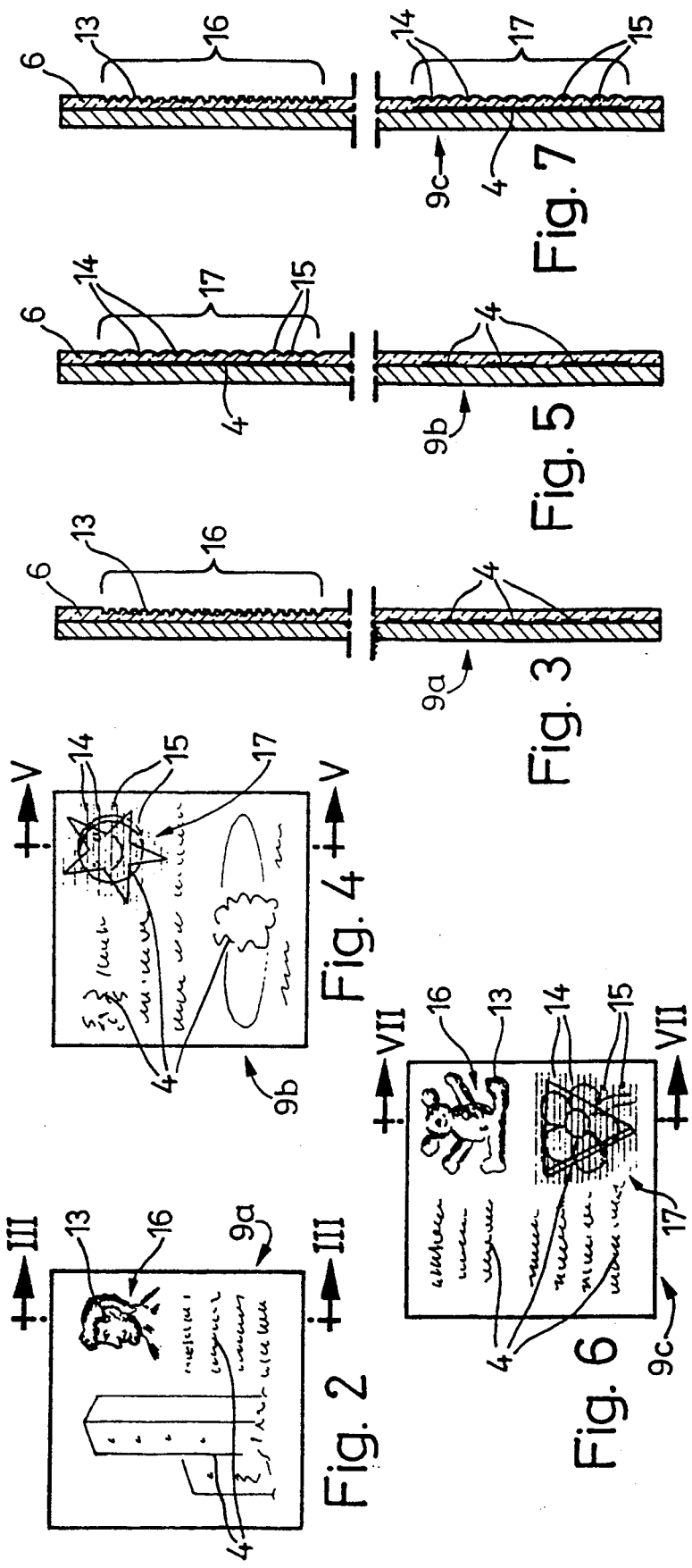

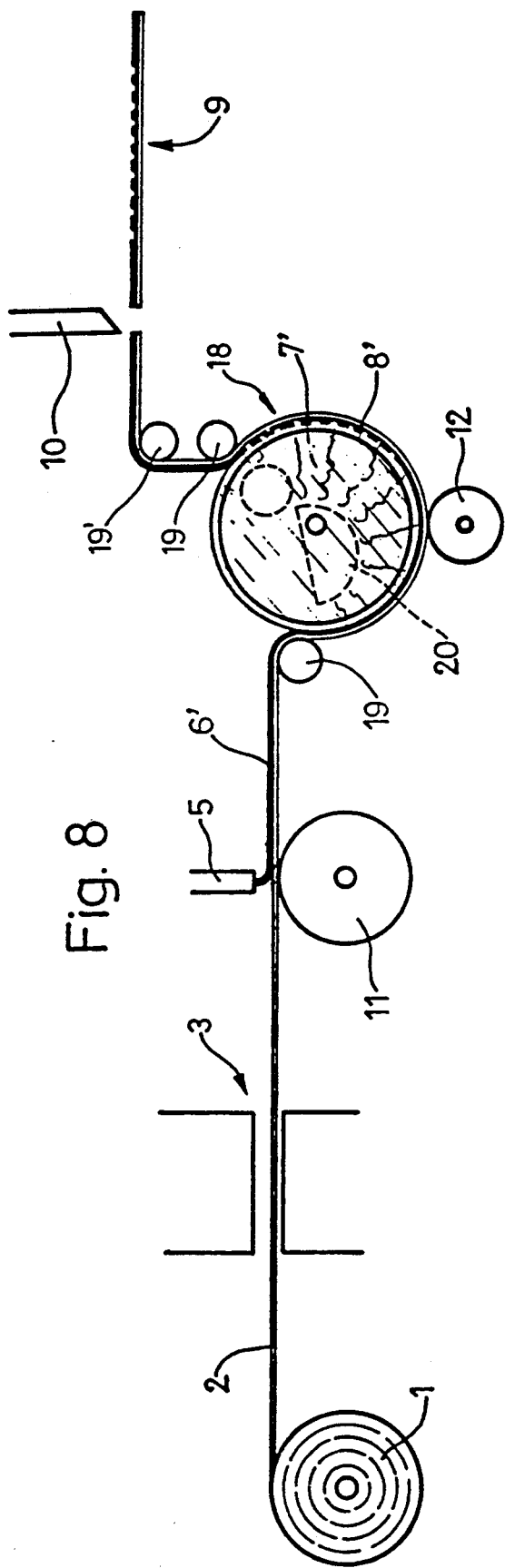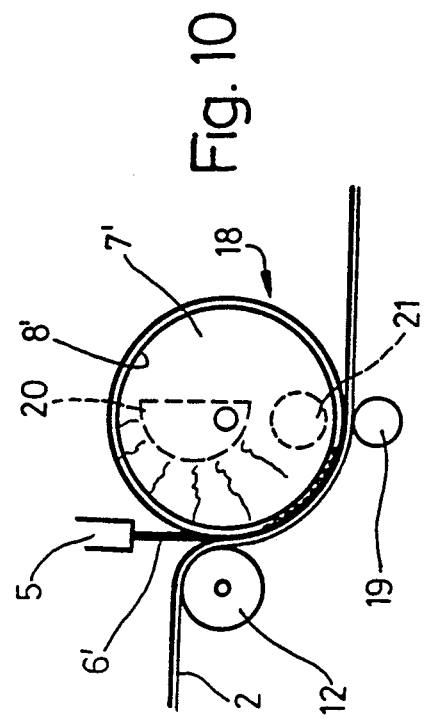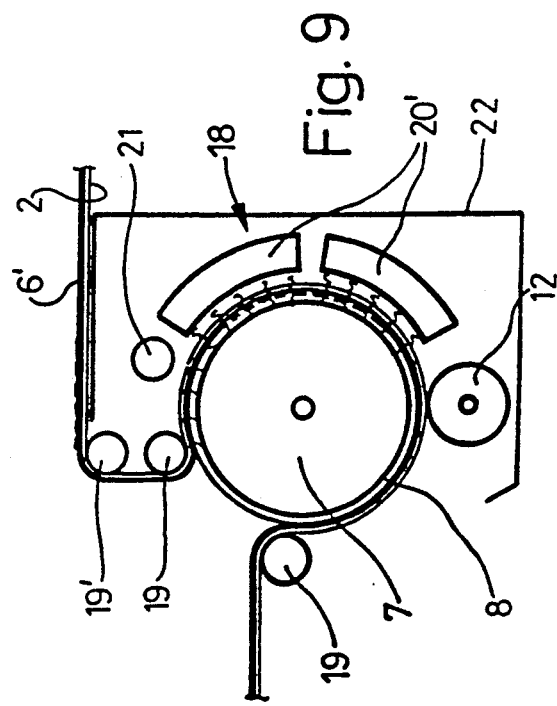

PROCESS FOR PREPARING PRINTED SHEETS WITH OPTICAL EFFECTS

FIELD OF THE INVENTION

The present invention relates to a process for the preparation of printed sheets with optical effects, of diffraction and reflection of light.

BACKGROUND OF THE INVENTION

There are currently various processes through which these effects are obtained on sheets having a front ply of plastics material suitably worked as a lens, behind which there are motifs which are viewed through said ply, providing the said effects.

Some of said processes are based on holographic reproduction, by engraving said reproduction on the rear surface of the plastics ply by heat and pressure and covering it with a reflective ply which allows the image to be viewed in 3-D through said plastics ply.

Other known processes are based on printing the motif to be viewed on a suitable sheetlike substrate, or directly on the rear surface of the plastics ply. The motif is printed with various stepped images or with multiple or offset photographs to obtain, through said ply, effects of images in different positions and/or depth after engraving striations or a reticule which forms optical lens on the front surface of the plastics ply.

With these processes and other known ones, sheets provided with the above effects are obtained, but they are of limited application due mainly to a thickness which makes them rather inflexible and which is a consequence of the nature of the said plastics ply.

SUMMARY OF THE INVENTION

The sheets with effects which are obtained by the process of this invention may be very thin and flexible and their applications are unlimited, since said process is implemented on paper or paperboard or any other absorbent material, with the said effects being provided on the sheets over the whole surface or on one or several areas thereof, the application of the process being of interest, for example, in banknotes and important documents, since these effects are practically impossible to falsify.

Likewise, the said thinness and flexibility of the sheets obtained with this process allow them to be manufactured as a continuous sheet, with subsequent shearing or die-cutting, whereby a higher production rate at a better price is obtained.

In view of all this, the process comprises a first step in which at least one side of the said sheets is printed by any conventional system with the desired motifs or illustrations, for the application thereto in a second step, on the whole or on a part of the printed surface, of a resin, a thermoplastic lacquer or other transparent material which allows a third step in which the engraving is performed on the resin-coated portion of said printed surface by heat and pressure, to produce the said effects.

Where a 3-D image is intended, the engraving will be effected with an ultrafine interference engraving, the sheets having been advantageously printed on a reflective ply.

Where a multiple image and/or depth effects are intended, striations or a grid forming cylindrical lenses will be engraved on the thermoplastic lacquer or resin, allowing the motifs previously printed on the sheets to be viewed with the said effects.

Both types of engraving, namely the ultrafine interferences and the cylindrical lenses, of the sheets may be carried out advantageously in corresponding different areas thereof, to give sheets in which one area will have 3-D effects and another will have multiple image and-/or depth effects.

The optical effects may be engraved on plastic sheets or other material of a nature to avoid the subsequent slow drying or polymerization of the resin. However, such sheets often require deformation in the printing process or during the engraving step which often destroys the desired optical effects and prevents them from being obtained.

As a result of this, a UV ray polymerizable resin or varnish is used, with both the engraving on the resin-coated side of the sheets which will produce the optical effects and the drying of the resin being carried out at the same time.

Therefore, the calender used for engraving said sheets has suitably mounted in the interior thereof at least one ultraviolet ray source which projects radiation on the resin-coated surface of the sheet which is being engraved at that same time in the calender which, to allow the passage of said rays, has the cylinder and the peripheral die plate thereof transparent.

Likewise, the ultraviolet ray source may be mounted outside the calender, directing it suitably with the sheet interposed therebetween, whereby said source is arranged behind the sheet, without any need for the parts of the calender to be transparent.

In both variants, the ultraviolet rays projected by the respective sources polymerize the resin-coated surface of the sheet practically at the same time as it is being engraved, it being possible to ensure the drying of said sheet by urging the sheet against the calender while rotating part of the way with it before release therefrom and providing a ventilation system, suitably mounted in each case, to dissipate the heat caused by the ultraviolet rays and which could prevent the perfect polymerization of the sheet.

When printing the sheets, reserve areas are contemplated where the resin or the like will thereafter be applied directly. The sheets may be printed before or after the application of the resin, with the consequent reserve areas, as desired in each case.

These and other features will be better understood from the following detailed description, to facilitate which there accompany the present description three sheets of drawings in which certain embodiments cited only as non-limitative examples of the scope of the invention have been illustrated.

BRIEF DESCRIPTION OF THE DRAWINGS

In the drawings:

FIG. 1 is a schematic of the process of the invention;

FIG. 2 is a front elevation view of a sheet having an area with an ultrafine interference engraving;

FIG. 3 is a cross section view of the sheet of FIG. 2 along the line III—III thereof;

FIG. 4 is a front elevation view of a second sheet having an area with a lenticular engraving;

FIG. 5 is a cross section view of the sheet of FIG. 4 along the line V—V thereof;

FIG. 6 is a front elevation view of a third sheet having one area with an ultrafine interference engraving and another lenticular engraved area;

FIG. 7 is a cross section view of the sheet of FIG. 6 along the line VII—VII thereof;

FIG. 8 is a schematic of the process in which the ultraviolet ray source is included in the interior of the calender;

FIG. 9 illustrates part of the schematic corresponding to the calender with the ultraviolet ray source outside the calender;

FIG. 10 illustrates an alternative embodiment of the part of the schematic corresponding to the calender and to the device which applies the resin to the sheet.

DETAILED DESCRIPTION OF THE INVENTION

Figure 11:
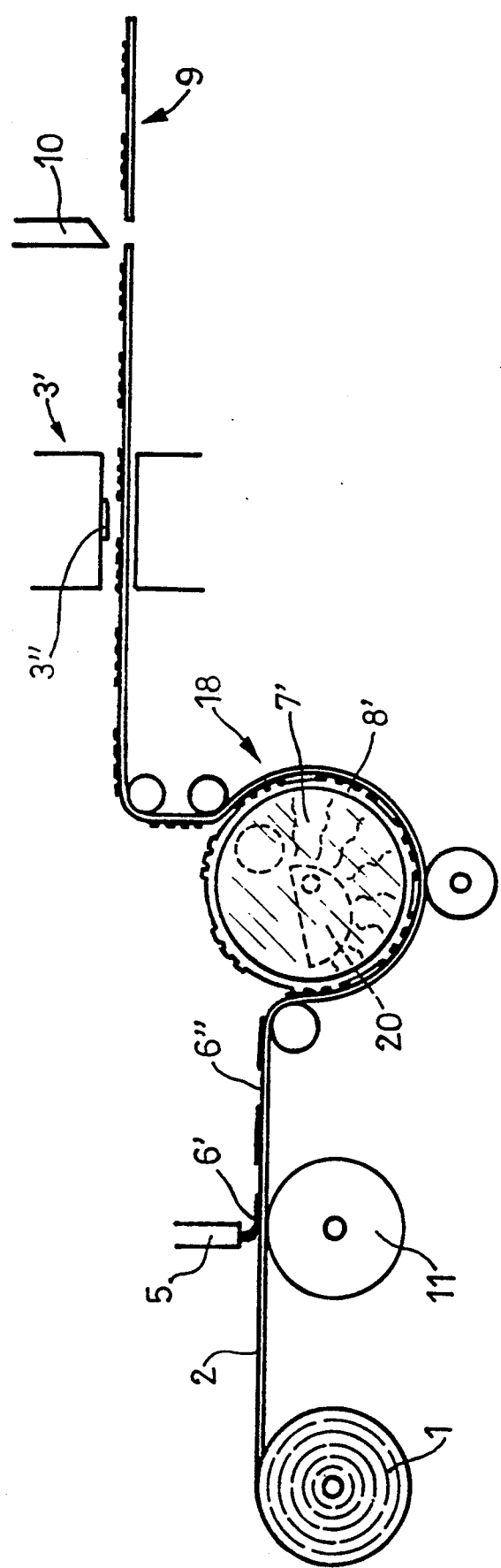
FIG. 11 is a schematic of the process with the printing operation in a step subsequent to that of the resin application.

The illustrated process for preparing printed sheets with optical effects is carried out from a reel 1 of absorbent paper 2, which is supplied to a lithographic, silk screen process or other printing means 3 which prints the pertinent motifs or illustrations 4 on one surface thereof.

After being printed, the paper 2 is fed through a device 5 which applies a lacquer, thermoplastic resin or other material 6 thereto, which impregnates the surface thereof, the thus impregnated paper 2 then being fed through a calender formed by a hot roll 7 comprising on the surface thereof a die plate 8 with which it engraves the ultrafine interferences or the cylindrical lenses on the resin-coated surface of the paper, this being finally cut into unit sheets 9 by a shears 10.

Both the device 5 supplying the resin 6 and the engraving roll 7 are provided thereunder with respective backing rolls 11 and 12 for the paper 2, on which said roll 7 applies an ultrafine interference engraving 13 or striations or grid 14 forming lenses 15, depending on the die plate 8 mounted in accordance with the optical effects to be provided on the sheets which will be obtained from the paper 2.

Said roll 7 may also be provided with a die plate 8 prepared to perform both engravings or, if preferred, two rolls 7 will be arranged one after the other, each provided with its corresponding die plate 8 for carrying out the said engravings with which the 3-D images or the effects of multiple image and/or depth, as the case may be, are obtained. Some of these engravings may be made on illustrations already printed on the paper 2 by the means 3 and which in combination with the engraving will provide the pertinent effect.

It is gathered from the foregoing that the sheets 9 obtained with the present process may have different engravings as reflected in the three sheets illustrated in FIGS. 2 to 7 and which are referenced 9a, 9b and 9c to differentiate them, the first one comprising an area 16 having an ultrafine interference engraving with 3-D effects, the second one an area 17 with lenticular engraving with double image and/or depth effects and the third one having two areas 16 and 17 with respective engravings of both classes.

As is logical, the sheets having a single type of engraving may have it over several portions of the surface thereof or over the whole of it, and the sheet which combines both engravings may have more engraved areas and with more of one type than of the other, depending on desire or needs.

It is also contemplated that the process of the invention may be implemented on loose leaves instead of on a reel.

According to FIG. 8, after being printed, the paper 2 is fed, while resting on the pertinent roll 11, under the device 5 which applies a resin or varnish 6' thereto. This material, which may be polymerized by ultraviolet rays, impregnates the surface of the paper, which is then fed, resin-coated, to a calender 18 which will apply thereto the engraving producing the optical effects, the resin-coated paper being wrapped on the periphery thereof and accompanying it in part of its rotation until being released from the calender to be fed thereafter to the shears 10 which will cut it into already engraved unit sheets 9.

The paper 2 is pressed against the calender 18 by the backing roll 12 arranged under said calender, there only being necessary a further two guide rolls 19 for the paper 2 where it enters and leaves the said calender, since the resin facilitates its adhesion thereto. Likewise, a further roll 19' may direct the paper to the shears 10.

During the operation of the calender 18, the resin 6' is almost completely dry or polymerized when the engraving starts. This polymerization is completed during a portion of the rotation of the calender, for which purpose the calender has the component roll 7' and the peripheral die plate 8' transparent, the former being preferably of glass and the latter of polyester, with an ultraviolet ray source 20 being suitably mounted in the interior of the said roll 7'. Said rays are projected by the source against the resin-coated surface of the paper 2 during its part rotation with the calender 18.

The ultraviolet ray source may also be installed outside the calender 18 (FIG. 9), and acts on the paper 2 from behind. In this case, the calender may be opaque and formed by conventional roll 7 and peripheral die plate 8, while the source may advantageously be formed by several units 20' disposed around the calender 18, coextensively with the portion where the paper 2 moves.

A fan 21 mounted inside the calender 18, or outside it, depending on the type of calender used, dissipates the heat of the ultraviolet rays radiated on the paper 2, aiding to perfect polymerization. In the latter case, a shield 22 directing the fan 21 towards the sources 20' is installed.

On the other hand, the resin 6' may advantageously be applied to the paper 2 practically at the same time as the latter is delivered to the calender 18 (FIG. 10) and also be radiated and pressed by the backing roll 12 at the same time, whereby, further to carrying out everything at the same time, the size of the plant and the engraving process time will be reduced.

As seen in FIG. 11, the process for preparing printed sheets with optical effects starts from the reel 1 of paper 2, which is fed under the device 5, supported on the roll 11, where a UV polymerizable resin or varnish 6' is applied, leaving reserve areas 6".

Thereafter the thus resin-coated paper is fed to a calender 18 where the optical effect producing engraving is effected, the paper being applied to the periphery of the calender and adhering thereto during part of the rotation thereof, after which it is released to be fed under a printing means 3' which prints the desired motifs 3" on the reserve areas 6".

Finally, the resin-coated, engraved and printed paper is fed to a shears 10 which will cut it into unit sheets 9.

During the operation of the calender 18, the resin 6' is practically dried or polymerized at the same time as the engraving is effected. To this end, the component roll 7' and peripheral die plate 8' of the calender are transparent, and have mounted therein at least one ultraviolet ray source 20 which projects them against the resin-coated surface of the paper 2 as it is fed through the calender 18.

It is understood that, according to the invention, the engraving process for the preparation of sheets with optical effects (holographic effects, effects based on a lens producing a double image or depth, or other special effects), may be implemented with or without heat and pressure.

I claim:

1. A process for making a printed sheet with an optical enhancement, in a substantially continuous operation, where the sheet is non-plastic, absorbent material, comprising the steps of first printing material on at least one surface of the sheet, then coating a portion of the sheet with a polymerizable resin at least where the printing has been placed, engraving the resin by passing the portion over a transparent calendar and exposing the resin to ultraviolet radiation from within the calendar to cure the resin.

2. The process as claimed in claim 1 wherein the engraving and exposing to ultraviolet radiation occur substantially simultaneously.

3. The process as claimed in claim 2 wherein the engraving and exposing to ultraviolet radiation occur on the same surface of the sheet.

4. The process as claimed in claim 1 wherein the engraving is in the form of striations forming optical lenses allowing the viewing, with multiple image effects, of the material printed on the sheet.

5. The process as claimed in claim 4 wherein the engraving is provided on one area of the sheet and other areas of the sheet are provided with reticular lenses.

6. The process as claimed in claim 1 wherein the resin is applied to the sheet adjacent the point of the calendar where a press roller is acting, and engraving of the resin-coated sheet is being effected by incidence of the ultraviolet rays.

7. The process as claimed in 1 including the step of using a sheet having an area previously printed and having other areas without printing thereon and the step of applying resin to said other areas.

* * * * *